United States Patent [19]

Staron et al.

[11] Patent Number: 4,670,862

[45] Date of Patent: Jun. 2, 1987

[54] APPARATUS FOR PRODUCING GEOPHYSICAL MEASUREMENTS IN A BOREHOLE

[75] Inventors: Philippe Staron, Mennecy; Pierre Gros, Buc, both of France

[73] Assignee: Societe Nationale Elf Aquitaine (Production) Tour Aquitaine, Courbevoie, France

[21] Appl. No.: 699,479

[22] Filed: Feb. 8, 1985

[30] Foreign Application Priority Data

Feb. 17, 1984 [FR] France .................................. 84 02395

[51] Int. Cl.⁴ .............................................. G01V 1/00
[52] U.S. Cl. ...................................... 367/25; 181/102; 367/911; 310/334; 324/347
[58] Field of Search .......................... 367/25, 911, 165; 181/102, 104, 105; 324/347, 367, 374; 175/97, 98, 99, 61; 166/100, 250

[56] References Cited

U.S. PATENT DOCUMENTS

| Re. 31,607 | 6/1984 | Vogel et al. | 181/102 X |
|---|---|---|---|
| 2,898,575 | 8/1959 | Hildebrandt | 367/86 |
| 3,288,536 | 10/1963 | Galis et al. | 175/89 X |
| 3,379,964 | 4/1968 | Segesman | 324/374 |
| 4,085,808 | 4/1978 | Kling | 175/61 X |
| 4,192,380 | 3/1980 | Smith | 166/250 |

*Primary Examiner*—Thomas H. Tarcza
*Assistant Examiner*—Tod Swann
*Attorney, Agent, or Firm*—Holman & Stern

[57] ABSTRACT

A measuring tool for producing geophysical measurements within a borehole comprises a crawler belt, at least a portion of which constitutes a support for a transducer. The crawler belt is continuously displaced within the bore hole by means of a suspension cable and guide pulley in cooperating relation with spiked shoes and retaining plates for maintaining at least the transducer-supporting portion of the crawler belt in a stationary position with respect to the borehole wall during each measurement stage.

21 Claims, 10 Drawing Figures

APPARATUS FOR PRODUCING GEOPHYSICAL MEASUREMENTS IN A BOREHOLE

BACKGROUND OF THE INVENTION

1. Field of the Invention

The present invention relates to an apparatus for producing geophysical measurements in a borehole.

2. Description of the Prior Art

Measurements performed in a borehole are generally of two main types.

The first type of measurement known as ultrasonic measurement is carried out by means of a tool which is lowered into the borehole at the end of a cable. The tool comprises one or a number of transmitters and one or a number of receivers in addition to means for turning-on or operating the transmitters at suitable instants, and means for transmitting the signals picked up by the receivers to the land surface for recording and processing.

Ultrasonic measurements are most often performed during movement of the tool, that is to say when the tool is retrieved slowly within the borehole towards the surface. The relatively low rate of displacement of the tool within the borehole (a few meters per minute) does not produce any parasitic noise in the receivers.

The receivers employed are hydrophones, these devices being in fact sensors which are responsive to vibratory pressure. The sensors receive compressional waves and possibly also parasitic waves derived from the compressional waves and generated by the inhomogeneities of the surrounding medium. The duration of each useful signal received on the sensor, after each transmission, is of the order of a few milliseconds, depending on the frequency of the signals transmitted.

Since the measurements are made during displacement of the tool, the traction cable of the tool is therefore continuously under tension and is wound continuously around a drum, the rotation of which is controlled, for example, by displacement means located at the surface.

Many types of ultrasonic measurement tools in current use make it possible to exclude waves which propagate within the mass of the tool itself and to produce acoustic paths having cylindrical symmetry about the axis of the borehole.

The second type of measurement relates to a vertical seismic profile, an oblique seismic profile or a wellbore seismic profile, this second type of measurement being completely different from the first type which was recalled earlier by way of reference.

In fact, in the case of petroleum prospecting, for example, it is necessary to determine the nature and characteristics of the subsurface strata which surround the borehole. To this end, seismic energy is generated at the surface and not within the borehole by means of a detonation (explosive charge), a suitable shock impact (dropping weight) or else a vibrator in contact with the ground surface. This seismic energy produces waves which propagate within subsurface strata and are received on geophones and no longer on hydrophones. The geophones are designed as velocimeters which are responsive to vibrational velocity and placed either on the ground surface, in which case they receive the waves reflected and/or refracted by the different subsurface strata, or within the borehole but in this case they must imperatively be in direct contact with the wall of the borehole, in contrast to ultrasonic measurement in which the sensors are usually immersed in the fluid which fills the borehole.

In all cases, the geophones or velocimeters are responsive to vibrational velocity and must permit determination of all the types of seismic waves generated by the energy emitted at the surface. In fact, direct mechanical coupling between the transmission means and the surface gives rise to all types of waves since the emitted seismic energy necessarily encounters inhomogeneities in the subsurface formations under exploration. Thus, it can no longer be considered sufficient either to receive one particular wave among others on the geophone or geophones or to accept a scalar quantity. On the contrary, the geophones must necessarily receive all waves (compressional waves or transverse waves) and in all directions in which they propagate in order to be able to distinguish all the possible directions of vibrational velocities at the time of processing.

A final point worthy of note is that, in the second type of measurement referred-to in the foregoing and in contrast to ultrasonic measurement, measurements are performed whilst the geophone or geophones remain stationary with respect to the borehole wall and are applied against the wall in order to ensure a satisfactory coupling.

Subsequent processing of the signals received by the geophones makes it possible to obtain useful information on the subsurface strata traversed by the waves from the shot point to the geophones.

A number of different techniques may be used. It is possible for geophones to be spaced regularly or not along the borehole and to process information recorded on the different geophones. It is also possible to use a tool which carries one geophone and is maintained stationary at each appropriate level of the borehole during each measurement.

In the second type of measurement, the major difficulty arises from the fact that, up to the present time, no effective method has yet been found for obtaining a satisfactory coupling of the geophone with the borehole wall.

One attempt has already been made to overcome this difficulty and is described in French Pat. No. 1,169,871. The device of the prior art comprises a tool fitted with a cylindrical element which serves to maintain a geophone assembly at the desired height within the borehole and prevents the geophone assembly from rotating with respect to the tool by means of a key-type connection. The geophone assembly comprises two arcuate spring blades disposed symmetrically on each side of the tool which is centered within the borehole, the springs being joined to each other by means of pins mounted on an intermediate member which is attached to the tool body. One of the spring blades is applied against the borehole wall whilst the other spring blade carries substantially at its vertex a pad which is pivotally mounted at the midpoint of the spring. The outer face of said pad is in contact with the borehole wall opposite to the wall against which the first spring is applied. A geophone is then fixed on the inner face of the pad and is connected by means of a conductor cable to the amplifying equipment located within the tool body.

A tool of this type constitutes a significant improvement over the technique which consists in placing geophones on the ground surface or at intervals along the borehole wall. However, it does not offer a complete answer to the problem of direct coupling with the borehole wall.

Although the pad is perfectly rigid and the tension of the springs does not permit any displacement of the pad in sliding motion along the borehole wall while a maasurement is in progress, it is nevertheless a fact that the parasitic waves generated by the emitted energy and propagated within the tool body, within the spring blades and within the pad are received by the geophone. This arises from the rigidity of the tool and the pad as well as the spring blades although to a lesser degree.

A further drawback arises from the fact that, in the case of a given measurement, the geophone is oriented in only one direction and is therefore capable of detecting only one type of wave.

A further disadvantage which appears to present the most crucial problem is that the blade spring which carries the geophone has only one degree of freedom as determined in the direction of deflection of the spring. The structure of the spring and the developed applied stresses do not permit flexibility of the spring in all directions. In consequence, there is no effective decoupling between the mass of the tool and the mass of the geophone and of the associated pad. Moreover, the tool has a considerable mass in comparison with that of the geophone assembly. This mass introduces a parasitic effect which is greater as the connection between the tool body and the geophone assembly has greater rigidity.

It should also be noted that, by reason of the rigid connection between the mass of the tool and the geophone, the fact that the mass of the geophone is smaller than that of the tool prevents useful vibration of the geophone on reception of the high frequencies of the transmission spectrum. These high frequencies are thus eliminated and the result thereby achieved is much the same as if the tool body and the relative flexibilities of the borehole walls constituted a filter for these high frequencies.

The device employed in the second type of measurement also comprises tool-displacement means which are attached to the tool by traction and suspension means.

Irrespective of the nature of the tool traction and suspension means just mentioned and regardless of whether these means are flexible or rigid, or whether they consist of a traction cable or a rod, the measurements are performed one after the other in succession up to the full height of the borehole and in the following manner, for example.

The measuring tool is lowered to the desired depth or level, whereupon said tool is placed in position and maintained stationary against the borehole walls by means of retractable arms. The measurements are then performed in respect of the borehole level considered.

Since the next measurements are to be made at a higher level, the tool must be displaced in the upward direction by folding-back the retractable arms and by actuating the traction means. Another positioning operation is then performed in exactly the same manner as the operation mentioned above.

It is readily apparent that these sequential measurements also entail the need for sequential operation of the traction and displacement means which must be stopped during measurements and displaced between measurements. In the case of the traction cable, an additional operation is necessary. This consists in re-tensioning said cable at the end of each series of measurements since the cable is released throughout the duration of the measurements in order to ensure seismic decoupling of the tool with respect to the surface displacement means.

In consequence, it is apparent that there is a relatively substantial loss of time throughout the entire sequence of operations, which includes a certain number of successive adjustments for the different tool positions within the borehole.

BRIEF SUMMARY OF THE INVENTION

The present invention is more particularly concerned with the second type of measurement mentioned earlier but is equally applicable to the first type of measurement by making use of hydrophones instead of geophones or alternatively a combination of both types of measurement by utilizing both hydrophones and geophones.

The present invention is directed to an apparatus for producing geophysical measurements within a borehole, of the type comprising a measuring tool, at least one transducer mounted on said measuring tool, means for displacing the tool along the borehole wall, resilient means mounted on said tool and adapted to position the transducer in close proximity to said wall during each measurement stage. The distinctive feature of the invention lies in the fact that the measuring tool comprises an endless belt, at least part of which constitutes a support for said transducer, and means for producing continuous revolving motion of the endless belt. Said belt-revolving means are adapted to cooperate with means for retaining and positional locking of at least the transducer-supporting portion of said endless belt with respect to said borehole wall during each measurement stage.

When the tool-displacement means are continuously controlled so as to permit continuous displacement of the measuring tool, seismic decoupling between the displacement means and the measuring tool is achieved since the transducer is motionless during each measurement stage.

In accordance with another distinctive feature of the invention, the device comprises a plurality of crawler belts and associated geophones for performing simultaneous measurements on portions of borehole wall which are in opposite directions.

Similarly, the present invention makes it possible to carry out peripheral measurements within the borehole.

In accordance with yet another distinctive feature of the invention, the geophones are coupled to the tool body by means of resilient members which are flexible in at least two directions, the elasticity of said flexible members being at least equal to the lowest elasticity of the subsurface stratum traversed by the borehole. Furthermore, the frequency of resonance of the mass of the geophone or geophones with the flexible means is at most equal to the frequency of resonance of said mass of the geophone or geophones with said lowest elasticity.

Connection of the geophone with the tool body by means which are flexible in at least two directions permits almost total decoupling of the mass of the tool body with respect to the mass of the geophone and consequently makes it possible to eliminate practically all the parasitic effects introduced into the measurements by the mass of the tool body. Furthermore, by virtue of this elastic connection, the geophone is capable of vibrating in the direction of the vibrational velocity component of the wave which it may receive.

BRIEF DESCRIPTION OF THE DRAWINGS

Other features of the invention will be more apparent to those versed in the art upon consideration of the following description with reference to the accompanying drawings, wherein.

DESCRIPTION OF THE PREFERRED EMBODIMENTS

The measuring device 1 illustrated in the figures is intended to be lowered into a borehole 2 which is delimited by the ground surface 5 and by its substantially cylindrical wall 3 which may or may not have surface irregularities 4. The borehole 2 penetrates subsurface strata which are not specifically illustrated in the drawings and certain characteristics of which are to be determined.

Means for controlling the displacement of the tool 1 are placed on the ground surface 5, these means being represented schematically in the form of a block 6.

In the preferred embodiment of the invention which is given by way of example, the control means 6 have the function of producing a continuous displacement of the measuring tool 1 through the intermediary of a traction cable 7 which is guided by an idler pulley 8.

Figures 1, 2, 9:
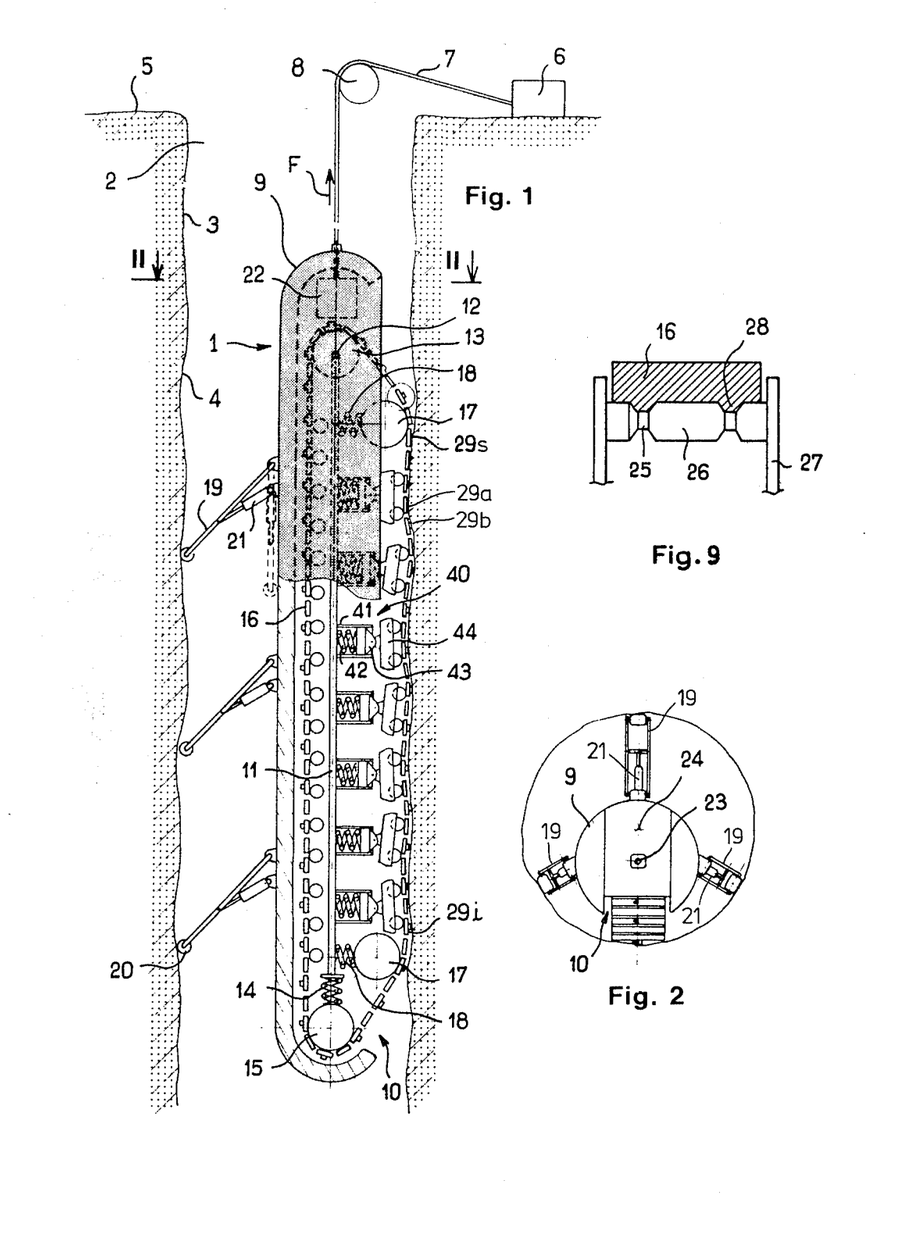
FIG. 1 is a diagrammatic cross-sectional view of a borehole and a measuring tool which has been introduced therein, said measuring tool being shown diagrammatically with a portion broken away and in a first embodiment of the invention.
FIG. 2 is a cross-sectional view taken along line II—II of FIG. 1.
FIG. 9 is a fragmentary cross-sectional view of a portion of crawler belt on its guiding roller-track.

As shown in FIGS. 1 and 2, the measuring tool comprises a body constituted by a casing 9 which is open on at least one face 10 and is suspended from the cable 7 at the top end thereof.

There is housed within the casing 9 a rod 11 which constitutes a substantially fixed element of the tool and the top end of which is rigidly secured to the stationary shaft 12 of a top rotary drum 13, said shaft 12 being rigidly fixed to said casing 9. The lower end of the rod 11 constitutes a bearing seating for one end of a spring 14, the other end of which is attached to a bottom rotary drum 15.

The measuring tool 1 is guided along the borehole wall 3 by means of retractable arms 19 each pivotally mounted at one end to the tool body and provided at the other end with a runner-wheel 20 which is capable of rolling along said wall 3. Each arm 19 is controlled by a jack 21 which is capable of moving the arm to the opened-out position or to the withdrawn position shown in dashed outline in FIG. 1. The jacks are supplied with hydraulic fluid from a control unit or connection box 22 housed within the tool body.

The vertical axis 23 of the tool coincides substantially with the axis of the rod 11 and is displaced laterally with respect to the vertical axis 24 of the borehole. The retractable arms 19 are preferably spaced at angular intervals of 120° with respect to each other in order to ensure correct positioning of the measuring tool 1 with respect to the portion of borehole wall 3 in which measurements are to be performed (as shown in FIG. 2).

An endless belt constituted for example by a crawler belt 16 is wound around drums 13 and 15 and passes over tensioning and guiding rollers 17 placed near the drums 13 and 15 and urged in the appropriate direction by springs 18 which are attached to the central rod 11.

The crawler belt 16 runs on a guiding roller-track delimited by channels 25 of rollers 26 in which are engaged ribs 28 of the crawler belt 16 and by angle-iron members 27 which are rigidly fixed to the tool body, as illustrated in FIGS. 1 and 9.

Figures 3, 10:
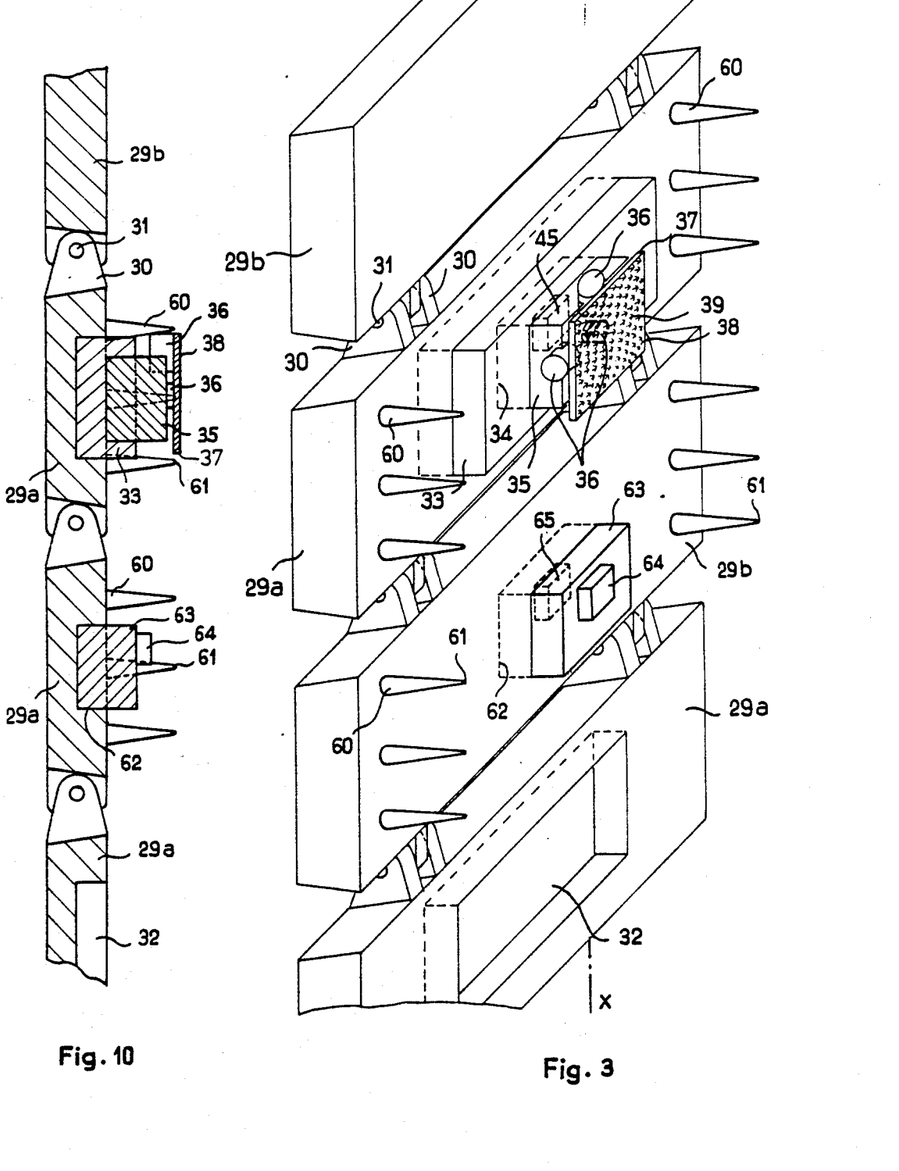
FIG. 3 is a perspective view of a portion of crawler belt employed in the tool shown in FIG. 1.
FIG. 10 is a fragmentary cross-sectional view portion of belt taken along line X—X of FIG. 3.

The crawler belt 16 is constituted by pads 29a, 29b, as shown in FIGS. 3 and 10. These pads are pivotally coupled to each other by means of articulation lugs 30 and pivot-pins 31. A pad 29b is inserted between two pads 29a in order to provide a pad 29a followed by a pad 29b in alternate sequence. In each pad 29a is formed a blind recess 32 of any suitable shape but preferably rectangular, in which is forcibly inserted an intermediate support plate 33 having a thickness which exceeds the depth of the recess 32. There is in turn provided in the intermediate support plate 33 a recess 34 in which a resilient shock-absorbing block 35 is also forcibly inserted. One or a number of transducers such as geophones 36 are grouped together in three different directions, each transducer being capable of vibrating in a preferential direction and thus of detecting the component of a vibration which propagates in said direction. In the embodiment shown in FIG. 3, the three geophones 36 are oriented in three orthogonal directions and are mounted on the resilient shock-absorbing block 35 in such a manner as to be mechanically decoupled with respect to the measuring tool 1.

Retaining and locking means (the function of which will hereinafter be described in connection with the operation of the measuring tool) are mounted on the pads 29a and 29b in such a manner as to be located in close proximity to the borehole wall 3 along which the crawler belt 16 is displaced. The retaining and locking means comprise in particular, on each pad 29a, a rigid plate 37 which is mounted in front of the geophones 36. The external surface 38 of plate 37 opposite to the borehole wall 3 is provided with retaining spikes 39 or pointed studs of any equivalent type, said spikes being preferably spaced at uniform intervals over the entire external surface 38 aforesaid. The height and shape of the spikes 39 will be chosen as a function of their desired depth of penetration into the borehole wall 3 and therefore as a function of the requisite effectiveness of attachment of the crawler belt 16 to said borehole wall 3.

The distribution of the sets of geophones 36 over the entire length of the crawler belt 16 can be modified and will usually depend on the portion of borehole wall 3 to be taken into consideration for measurements.

Spikes 60 are also provided both on the pads 29a and on the pads 29b in order to increase the contact of the portion of crawler belt with the borehole wall and thus to prevent any slippage of said belt portion on said wall. The spikes 60 or like retaining elements are distributed over the surface of the pads 29a and 29b in any desired manner. However, the pointed tips 61 of the retaining spikes are so arranged as to be located in a plane which is slightly set back with respect to the plane defined by the internal surface of the retaining plate 37. In this manner, the crawler belt 16 is maintained in position against the borehole wall both by the retaining plates 38 and by the spikes 60.

When making use of a crawler belt 16 comprising a fairly large number of geophones 36 of the type described in the foregoing, it is always ensured that at least several sets of geophones 36 produce significant measurements, even when the borehole wall 3 has substantial surface irregularities 4.

In order to permit application of the maximum number of pads 29a, 29b against the useful portion of the borehole wall 3, bearing and positioning means 40 are incorporated in the measuring tool 1. The means 40 are mounted on the rod 11 in uniformly spaced relation. Each element comprises a tube 41 rigidly fixed to the central rod 11 and a spring 42 which is flexible in at least two directions and housed within the tube 41. Said spring 42 is attached to a thrust member 43 and this latter is pivotally coupled to a bearing unit 44 which is pivotally mounted on the pivot-pin of the thrust member.

The operation of the device comprising a crawler belt 16 as described with reference to FIGS. 1 to 3 is as follows:

When the measuring tool is upwardly displaced towards the ground surface 5 after having been lowered to the bottom of the borehole 2, winding of the cable 7 has the effect of applying a tractive force to the measuring tool 1. Continuous winding of the cable 7 thus produces continuous upward travel of the measuring tool 1 and therefore a displacement of the crawler belt 16 in the direction of the arrow F through the intermediary of the stationary elements of the tool and especially of the casing 9 and the shaft 12 which is rigidly fixed to said casing. Displacement of the drum 13 in the direction of the arrow F produces a rotation of the crawler belt 16. By reason of the fact that a portion of the crawler belt 16 is anchored to the borehole wall 3, the pad located at the top and designated by the reference 29s remains motionless with respect to said wall until it takes up the position of the pad designated by the reference 29i after the measuring tool has been displaced over a distance equal to the distance between the pad 29s and the pad 29i. The time interval during which each pad remains motionless with respect to the borehole wall defines a measurement stage during which the geophones 36 (which are also motionless with respect to the borehole wall 3) are in readiness for detecting the vibrations which propagate within the subsurface strata around the borehole 2.

Means (not shown in the drawings) are provided on the top roller 17 for detecting and transmitting the passage of at least the pad 29s to the ground surface in order to ensure accurate positioning of said pad with respect to the tool body and consequently in order to locate the stratum of interest.

In the foregoing, no reference has been made to an emission of acoustic waves which are capable of producing vibrations. This emission can be produced by means which are conventional and are either housed within the control unit 6, for example, or else independent and incorporated in that case in the measuring tool 1 at the level of the pads.

In the case of an independent source, there is formed in a pad 29b a blind recess 62 for receiving a shock-absorbing block 63 which is similar to the shock-absorbing block 35 of the pads 29a. An acoustic-wave source 64 is mounted on the shock-absorbing block 63 instead of and in the same location as the geophones 36 so as to be elastically decoupled from the tool body in the same manner as the geophones.

A telemetering receiver 65 is associated with the acoustic-wave source 64 and controlled by the connection box 22. The telemetering means designed to permit control of the source 64 by the telemetering receiver 65 and transmission of data collected by the geophones 36 will not be described in detail since they are well known to those versed in the art.

On the pads 29a, there is also mounted a telemetering transmitter 45 which transmits the data received on the geophones 36 to the connection box 22.

Preferably, all the control devices which are necessary for the operation of the telemetering means 45 and 65 are grouped together within said connection box 22.

The differences in length of contact of the crawler belt 16, by reason of surface irregularities 4 of the borehole wall 3, are compensated in the measuring tool by means of the spring 14.

It is thus possible by means of the present invention either to displace the measuring tool 1 continuously while the geophones 36 remain stationary with respect to the borehole wall 3 and to use said tool in the second type of measurement indicated in the introductory part of this description, or else to displace said tool in non-continuous motion as is the case in the first type of measurement.

Figure 4:
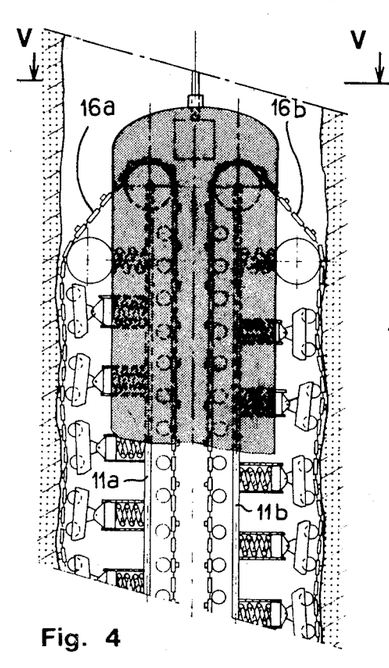
FIG. 4 is a fragmentary view of a measuring tool in a portion of borehole in a second embodiment.
Figure 5:
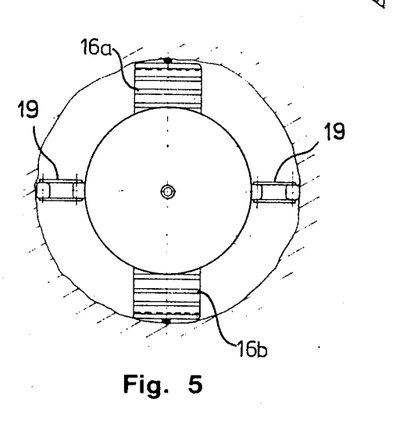
FIG. 5 is a cross-sectional view taken along line V—V of FIG. 4.

Another embodiment of the measuring tool 1 is illustrated in FIGS. 4 and 5. The tool 1 comprises two crawler belts 16a and 16b together with all their accessories as described with reference to FIGS. 1 to 3, which will not be described further. A tool comprising two crawler belts 16a and 16b permits detection of vibrations in two opposite portions of the borehole wall. In this embodiment, the retractable arms 19 (not visible in FIG. 4) move along the portions of borehole wall other than those on which the crawler belts 16a and 16b are applied. The central rod 11 is replaced by two rods 11a and 11b, the rod 11a being assigned to the crawler belt 16a whilst the rod 11b is assigned to the belt 16b.

Figure 6:
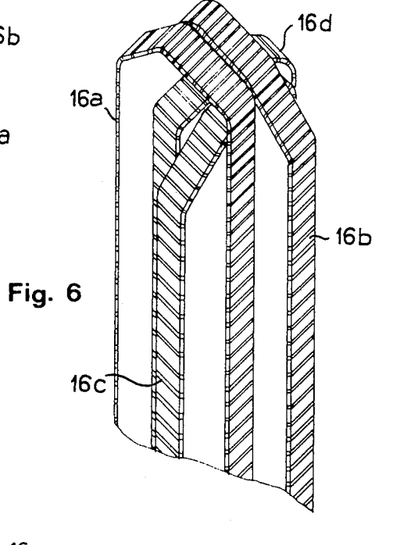
FIG. 6 is a fragmentary view in perspective showing four crawler belts employed in a third embodiment of the tool in accordance with the invention.
Figure 7:
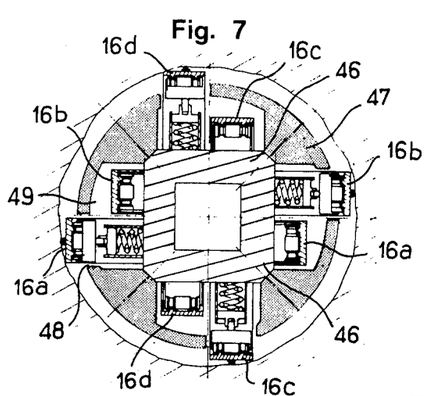
FIG. 7 is a transverse cross-sectional view of the tool in accordance with the third embodiment.

In another embodiment shown in FIGS. 6 and 7, the measuring tool comprises four crawler belts 16a to 16d which are coupled in pairs. The crawler belts 16a and 16b are assigned to two opposite portions of borehole wall whilst the other two belts 16c and 16d are assigned to portions of the wall which are perpendicular to the preceding. The four belts 16a to 16d are mounted around a hollow central rod 46 within which electric cables or conductors can be passed. The body 47 of the measuring tool 1 has open portions 48 and blind housings 49 which serve as passageways for the crawler belts. In this manner the vibrations which propagate within the four portions of borehole wall corresponding to the crawler belts 16a to 16d are detected simultaneously. For obvious reasons of operational requirements, the crawler belts 16a to 16d do not have the same length. Thus the pair of inner crawler belts 16c, 16d is shorter than the pair of outer belts 16a, 16b. Under these conditions, the useful measuring length is related to the shorter pair of crawler belts, said useful length being the distance between the pad 29s and the pad 29i shown in FIG. 1.

Figure 8:
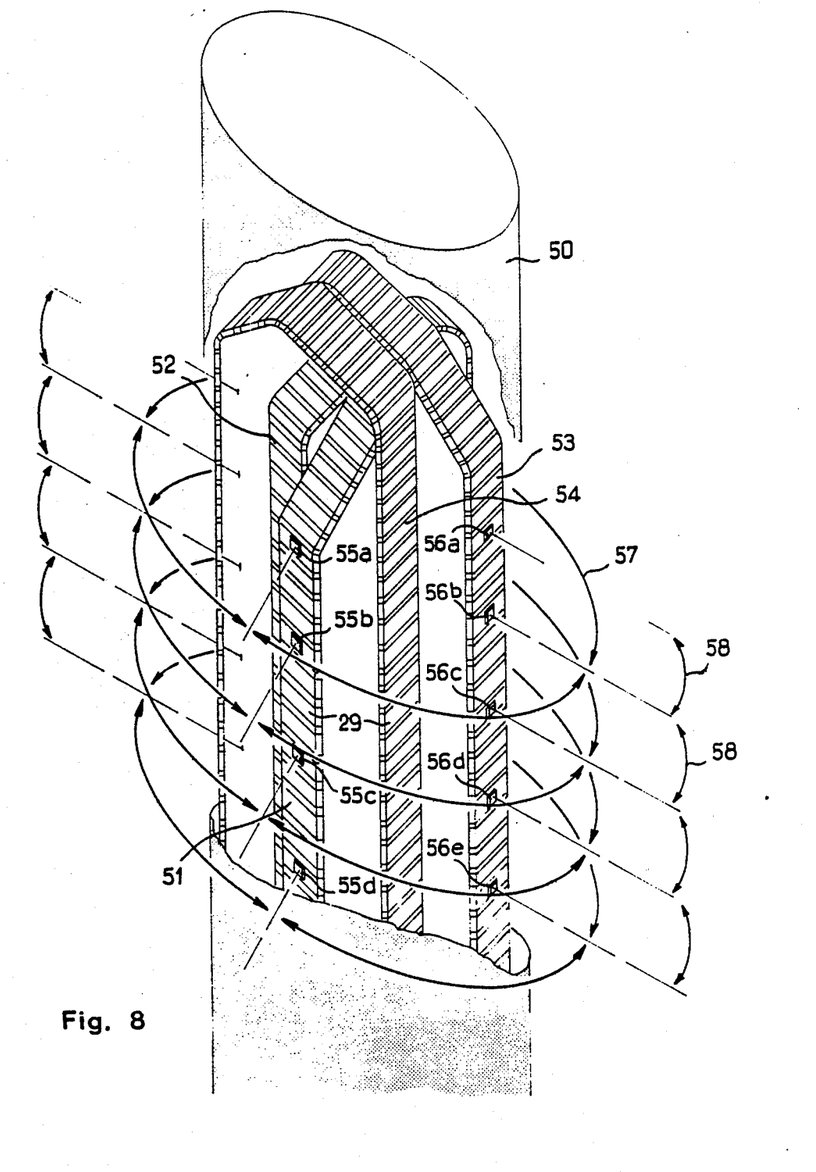
FIG. 8 is a partial diagrammatic view in perspective and showing four crawler belts for peripheral measurements.

In some cases, peripheral measurements are desired. By virtue of the present invention, such measurements are made possible by the use of a measuring tool having four crawler belts as illustrated in FIG. 8.

It will be apparent that, in this schematic figure, only those elements which are necessary in order to gain a clear understanding of the device are illustrated whereas the other necessary elements are those described with reference to the other figures.

The borehole 2 is represented by an envelope 50 in which portions have been broken away in order to show four crawler belts 51 to 54 coupled together in pairs, the pair 51-52 being housed within the pair 53-54.

In this embodiment, means 55 are provided for the transmission of acoustic waves and means 56 are provided for the reception of vibrations which propagate within the subsurface strata around the borehole.

The acoustic transmitters 55, in particular the transmitters 55a to 55d, are mounted on the crawler belts 51 and 52, the acoustic receivers or geophones 56 and in particular the receivers 56a to 56e being mounted on the crawler belts 53 and 54 at right angles to the preceding in order to ensure that each transmitter 55 is located between two receivers 56. In addition, the transmitters 55 and associated receivers 56 are located in the same horizontal plane. With reference to FIG. 8, it is thus apparent that the second transmitter 55b, counting from the top downwards, is associated with the third receiver 56c, again counting from the top. The other two transmitters and receivers of the crawler belts 52 and 54 (not shown in the figure) determine with the transmitter 55b and the receiver 56c a plane which is delimited in the figure by an ellipse 57. The different ellipses 57 are located at different levels within the borehole 2. The distance between two consecutive ellipses defines the thickness of the subsurface stratum which is of interest for the purpose of measurement. The distances are represented by arrows 58 and correspond to the distance between two consecutive transmitters 55 or two consecutive receivers 56 located in two consecutive ellipse planes 57. In the example of FIG. 8, the so-called intertransducer distance between two consecutive transmitters or two consecutive receivers on one and the same crawler belt is equal to the width of four pads 29, but the value chosen could be either shorter or longer if necessary. The intertransducer distance determines the difference in length between the crawler belts 51 to 54 considered in pairs. A simple solution consists in choosing an intertransducer distance and in determining a difference in length between the crawler belts which is a multiple of said intertransducer distance. Accordingly, the position-locations in which the transmitters 55 and receivers 56 are placed as well as the measurements performed by means of these transmitters and receivers will be coherent and will produce excellent results.

In an alternative arrangement, the acoustic transmitters and receivers can be mounted in alternate sequence on each pair of associated crawler belts such as the belts 51 and 53, for example, so that in one and the same horizontal plane, a receiver of the crawler belt 51 thus corresponds to a transmitter of the belt 53 and conversely.

Throughout the foregoing description, reference has been made to means for displacing the measuring tool 1 and controlled from the ground surface 5 of the borehole 2. It is clearly apparent that, if this were made possible by the dimensions of the borehole as well as the overall dimensions of equipment introduced in said borehole, independent tool-displacement means could be employed, for example, by equipping the measuring tool with a motor which would cause the measuring tool to advance either continuously or non-continuously, depending on the type of measurements to be performed.

In order that each geophone 36 may be capable of suitable vibration in the direction of the component of the detected vibrational velocity, it is necessary to ensure that this geophone is mechanically decoupled from the tool body 9, 47 which is associated therewith. In point of fact, the lowest characteristic elasticity s of the borehole wall 3 introduces an elastic coupling with the geophones 36. Since the elasticity S of the shock-absorbing block 35 produces action on said geophones, an elastic system in equilibrium is therefore constituted by the tool body, the ancillary arms 19 and the other elements of the tool having a total mass M, by the assembly formed by the sets of geophones 36, the retaining plates 37 and the shock-absorbing blocks 35 having a total mass m, and by the elasticity s of rock formations. In order to obtain good decoupling, it is accordingly necessary to determine an elasticity S which must be higher as the mass M is of greater value with respect to the mass m. Calculations show that, when $S=s$, the vibrational velocity of each geophone assembly is one-half the vibrational velocity of rock formations. In this case, it is necessary to ensure that the resonance frequency of the mass M with the elasticity S is equal to the resonance frequency of the mass m with the elasticity s.

The measuring tool 1 described with reference to FIGS. 1 to 10 comprises retaining and locking means for the purpose of ensuring that the portion of crawler belt located between the pads 29s and 29i is maintained in a stationary position with respect to the wall of the borehole. As can readily be understood, these means could be modified and/or suppressed at least in part when a change is made in the orientation of the crawler belt or in the material which constitutes said belt. In point of fact, in a borehole having a horizontal axis and not a vertical axis as shown in FIG. 1, it is possible to provide a measuring tool in which the weight of the tool and/or in which the application members could be such as to dispense with any further need for the retaining and locking means described in the foregoing but clearly on condition that said application members maintain a portion of the crawler belt in a stationary position during each measurement stage.

Similarly, when making use of a crawler belt or endless belt having a coefficient of adhesion to the wall of a horizontal or vertical borehole such that belt slippage on the borehole wall could not occur during each measurement stage, then in that case the retaining and locking means would in all probability be substantially modified or even dispensed with in order to take into account the physical characterics of the material constituting said crawler belt or endless belt.

As will readily be apparent, the invention is not limited in any sense to the embodiments hereinbefore described with reference to the accompanying drawings. Depending on the applications which may be contemplated, any number of alternative forms of construction within the capacity of those conversant with the art may accordingly be considered without thereby departing either from the scope or the spirit of the invention.

We claim:

1. In an apparatus for producing geophysical measurements within a borehole including a measuring tool, at least one transducer mounted on said measuring tool, means for displacing the tool along the borehole wall, and resilient bearing means mounted on said tool and adapted to position the transducer in close proximity to the borehole wall during each measurement stage, the improvement wherein the measuring tool comprises:

an endless crawler belt of constant length comprised of a plurality of separate pads pivotally coupled together;

an internal guiding roller track on which said crawler belt is displaceably guided;

transducer support means on at least a portion of said crawler belt;

belt revolving means for producing continuous revolving motion of said crawler belt; and retaining and locking means adapted to cooperate with said belt revolving means for retaining and locking at least said transducer support means in position with respect to the borehole wall during each measurement stage.

2. An apparatus as claimed in claim 1 wherein: said plurality of transducers comprises at least one set of three acoustic transducers disposed in three directions relatively perpendicular to each other.

3. An apparatus as claimed in claim 2 wherein:

said retaining and locking means comprises at least one retaining plate having an external face facing outwardly with respect to said crawler belt, and a plurality of spikes distributed over the entire surface of said external face for engagement with the borehole wall during each measurement stage; and said at least one set of acoustic transducers is mounted between said crawler belt and said at least one retaining plate.

4. An apparatus as claimed in claim 2 wherein:

said transducer support means comprises at least one resilient block; and said at least one set of acoustic transducers is interposed between said at least one resilient block and said at least one retaining plate.

5. An apparatus as claimed in claim 3 wherein said transducer support means further comprises:

at least one intermediate supporting member mounted on said crawler belt; and a recess formed in said at least one intermediate supporting member, said at least one resilient block being forcibly fitted in said recess.

6. In an apparatus for producing geophysical measurements within a borehole including a measuring tool, at least one transducer mounted on said measuring tool, means for displacing the tool along the borehole wall, and resilient bearing means mounted on said tool and adapted to position the transducer in close proximity to the borehole wall during each measurement stage, the improvement wherein the measuring tool comprises:

an endless crawler belt;

a transducer support means on at least a portion of said endless belt;

at least one transducer on said transducer support means;

belt revolving means for producing continuous revolving motion of said endless belt;

retaining and locking means adapted to cooperate with said belt revolving means for retaining and locking at least said transducer support means in position with respect to the borehole wall during each measurement stage;

a guiding roller track comprising a plurality of spaced rollers for supporting said crawler belt for movement along said track;

a substantially stationary member in said measuring tool substantially stationary with respect to said measuring tool; and wherein said resilient bearing means comprises a plurality of coupling members mounted on said measuring tool, spring means mounted between said substantially stationary member and each coupling member, and a bearing unit pivotally mounted on each coupling member and adapted to be resiliently applied against said rollers by said spring means.

7. An apparatus as claimed in claim 6 wherein:

said measuring tool further comprises a casing having an open side facing outwardly toward the borehole wall when in use;

said substantially stationary member comprises a rod member substantially centrally disposed in said casing;

said retaining and locking means comprises retaining plates on said crawler belt adapted to be applied against the borehall wall in use; and said guiding roller track further comprises two drums, one of said drums being rotatably mounted on a stationary shaft supported on said casing.

8. An apparatus as claimed in claim 7 and further comprising:

means on said measuring tool for compensating for variations in the tension of said crawler belt caused by surface irregularities of the borehole wall in use.

9. An apparatus as claimed in claim 8 and further comprising:

retractable arms operatively mounted on said measuring tool in relatively spaced relationship at angular intervals of 120° for guiding and applying said measuring tool against the borehole wall in use.

10. An apparatus as claimed in claim 9 wherein:

said measuring tool has a substantially central axis extending substantially parallel to the central axis of the borehole at the portion of the borehole in which said measuring tool is disposed at any one time in use;

said central axis of said rod is substantially coaxial with respect to said substantially central axis of said measuring tool; and said substantially central axis of said measuring tool is displaceable laterally with respect to said central axis of the borehole.

11. An apparatus as claimed in claim 7 wherein said means for displacing the tool along the borehole wall comprises:

a traction cable connected to said measuring tool; and a displacement means connected to said traction cable for winding and unwinding said traction cable.

12. An apparatus as claimed in claim 4 wherein:

said transducers comprise geophones; and data transmitter means is provided for transmitting data received by said geophones.

13. An apparatus as claimed in claim 12 wherein:

said data transmitter means is housed within said resilient block;

a connection box is mounted on said measuring tool; and receiving means is provided in said connection box for receiving data from said data transmitter means.

14. In an apparatus for producing geophysical measurements within a borehole including a measuring tool, at least one transducer mounted on said measuring tool, means for displacing the tool along the borehole wall, and resilient bearing means mounted on said tool and adapted to position the transducer in close proximity to the borehole wall during each measurement stage, the improvement wherein the measuring tool comprises:

an endless belt;

transducer support means on at least portion of said endless belt;

at least one transducer on said transducer support means;

belt revolving means for producing revolving motion of said endless belt; and retaining and locking means adapted to cooperate with said belt revolving means for retaining and locking at least said transducer support means in position during each measurement stage.

15. An apparatus as claimed in claim 14, wherein:

the means for displacing the tool comprises means external and separate from the measuring tool and connected to the measuring tool so that when operated said belt revolving means produces continuous movement of the belt and the measuring tool while said at least one transducer remains stationary with respect to the borehole wall during each measurement stage.

16. An apparatus as claimed in claim 14 wherein:

the measuring tool further comprises a plurality of endless crawler belts each having transducer support means thereon; and said at least one transducer comprises a plurality of sets of geophones.

17. An apparatus as claimed in claim 16 wherein:

said measuring tool comprises a protective housing member, a hollow central body within said protective housing member, and four hollow passages on said protective housing member; and said plurality of endless crawler belts comprises four crawler belts, each operatively disposed in one of said passages for revolving around said hollow central body, said belts being associated in pairs so that measurements may be made on a plurality of portions of the borehole wall in relatively angular directions.

18. An apparatus as claimed in claim 17 wherein:

said measuring tool has a central axis;

two crawler belts having different lengths than and operate in a direction perpendicular to the other two crawler belts;

said at least one transducer further comprises a plurality of acoustic transmitting transducers spaced at intervals along one crawler belt of each pair of crawler belts;

said geophones are spaced at intervals along the other crawler belt of each pair of crawler belts;

said transmitting transducers and geophones of each associated pair of crawler belts are positioned on said belts to form pairs of associated transmitting transducers and geophones with each pair lying substantially in the same plane extending perpendicular to said central axis; and the difference in length between the associated crawler belts of each pair of crawler belts comprises a multiple of the distance between two consecutive transmitting transducers.

19. An apparatus as claimed in claim 17 wherein:

said at least one transducer further comprises a plurality of acoustic transmitting transducers; and said acoutic transmitting transducers and geophones are arranged alternately along each crawler belt so that said acoustic transmitting transducers of one crawler belt of each pair of associated crawler belts are associated with and lie in the same planes as said geophones of the other crawler belt of each pair of associated crawler belts.

20. An apparatus as claimed in claim 14 wherein:

said endless belt comprises a plurality of belt pads pivotally connected together;

said transducer support means comprises a plurality of transducer support members on alternate belt pads; and said at least one transducer comprises a geophone mounted on each transducer support member.

21. An apparatus as claimed in claim 14 wherein:

said endless belt comprises a crawler belt of constant length comprised of a plurality of separate pads pivotally connected together; and an internal guiding roller track is provided on the measuring tool on which said crawler belt is displaceably guided.

* * * * *